United States Patent
Houseworth et al.

(10) Patent No.: US 8,706,580 B2
(45) Date of Patent: *Apr. 22, 2014

(54) METHOD, SYSTEM, AND COMPUTER PROGRAM FOR PREDICTING TAX LIABILITIES AND BENEFITS

(75) Inventors: Jason Houseworth, Olathe, KS (US); Samuel Brent Passer, Overland Park, KS (US); Howard C. Wright, III, Kansas City, MO (US)

(73) Assignee: HRB Tax Group, Inc., Kansas City, MO (US)

( * ) Notice: Subject to any disclaimer, the term of this patent is extended or adjusted under 35 U.S.C. 154(b) by 498 days.

This patent is subject to a terminal disclaimer.

(21) Appl. No.: 12/767,637

(22) Filed: Apr. 26, 2010

(65) Prior Publication Data

US 2011/0264569 A1      Oct. 27, 2011

(51) Int. Cl.
    *G06Q 40/00*     (2012.01)
(52) U.S. Cl.
    USPC ............................................................. 705/31
(58) Field of Classification Search
    USPC ............................................ 705/36 T, 30–45
    See application file for complete search history.

(56) References Cited

U.S. PATENT DOCUMENTS

| | | | |
|---|---|---|---|
| 7,257,553 B1 | 8/2007 | Baker | |
| 7,769,647 B1* | 8/2010 | Char et al. | 705/31 |
| 7,860,763 B1* | 12/2010 | Quinn et al. | 705/31 |
| 7,925,553 B2* | 4/2011 | Banks et al. | 705/31 |
| 8,060,423 B1* | 11/2011 | Rukonic et al. | 705/35 |
| 2002/0111888 A1 | 8/2002 | Stanley et al. | |
| 2003/0033272 A1* | 2/2003 | Himmel et al. | 707/1 |
| 2009/0228380 A1* | 9/2009 | Evanitsky | 705/31 |
| 2010/0153138 A1* | 6/2010 | Evans | 705/4 |

FOREIGN PATENT DOCUMENTS

| | | |
|---|---|---|
| JP | 2003-178195 A | 6/2003 |
| JP | 2004-355071 A | 12/2004 |
| KR | 1020010108242 A | 12/2001 |

OTHER PUBLICATIONS

Notification of Transmittal of the International Search Report and the Written Opinion of the International Searching Authority, or the Declaration dated Dec. 9, 2011, in corresponding International Patent Application No. PCT/US2011/032493; International filing date: Apr. 14, 2011; Applicant: HRB Tax Group, Inc.

* cited by examiner

*Primary Examiner* — Thomas M Hammond, III
(74) *Attorney, Agent, or Firm* — Erise IP, P.A.

(57) ABSTRACT

A method, a system, and a computer program for predicting an impact of a tax event on a user's tax liabilities at any intermediate time during a current tax year based on a comparison of known and predicted user information related to the user and the user's taxes, tax event information, and a tax deduction database of tax deductions, credits, and eligibility rules. The computer program and method for predicting the impact of the tax event comprise acquiring information about the user from a user profile, acquiring information about the tax event, comparing the user information and the tax event information with requirements for tax deductions and credits offered by a taxing authority, and identifying deductions or credits having requirements related to the user information and the tax event information. Furthermore, embodiments may also comprise determining a probability that the user will qualify for the deduction or credit based on both the known and predicted user information, the tax event information, and the requirements for tax deductions and credits for the current year.

20 Claims, 3 Drawing Sheets

METHOD, SYSTEM, AND COMPUTER PROGRAM FOR PREDICTING TAX LIABILITIES AND BENEFITS

BACKGROUND

1. Field

Embodiments of the present invention relate to a method, a system, and a computer program for predicting an impact of a tax event on a user's tax liabilities at any intermediate time during a current tax year based on a comparison of known user information, predicted user information, tax event information, and tax deductions, credits, and eligibility rules for a particular deduction.

2. Related Art

Tax preparation software is currently available for use in determining a user's tax liability for the previous year by asking the user questions regarding their gross annual income, purchases, taxes paid throughout the year, and other financial actions taken by the user. Although the user may guess their total deductions and tax liability for the current tax year based on the previous year's tax return, such a method is unreliable due to possible changes in the user's income, changes in the user's purchases, changes in the user's life events, or changes in tax laws compared with the previous tax year. Accordingly, there is a need for a method, a system, and a computer program that assists the user with computing and predicting, at an intermediate time in the current tax year, the tax impact of a tax event, such as a purchase of a good or service.

In addition to the problems stemming from knowing the tax impact of the tax event at an intermediate time in the current tax year, there is no method, system, or computer program for assisting the user in determining the impact of the tax event, such as the purchase, prior to making the purchase, such as at a point of sale ("POS"). Accordingly, there is a need for a method, system, and computer program for assisting a user in determining how a particular purchase may affect their tax bill for the current year prior to or in conjunction with making the purchase.

Furthermore, as users go about their daily activities, users are generally not aware of purchases they could make or actions they could take to decrease tax liabilities or otherwise maximize tax benefits available to them. For example, a combination of factors may need to be considered to determine if a user is eligible for a particular deduction or credit, such as a user's occupation, income, age, number of dependents, location, and medical expenses. It is possible that a user may be aware of a few tax deductions available to them, but the user is seldom aware of all the combinations of factors that could affect their deduction eligibility. Thus, users may unknowingly miss opportunities to make purchases or take actions that could reduce their tax liability. In turn, users may also unknowingly make purchases or take actions that could increase their tax liability. Accordingly, there is a need for a method, system, and computer program that will educate a user on potential tax benefits or potential tax consequences of purchases or actions based on known information about the user.

There is also a need for a method, system, and computer program that prompts a user for additional information based on known information so as to determine a tax benefit or tax consequence.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

The present invention is a method, system, and computer program for broadly determining the tax liabilities or benefits of a tax event, such as a purchase of a good or service or an action, such as investing in an IRA or receiving a raise, at an intermediate time in a current tax year. Embodiments of the present invention broadly comprise acquiring both known and predicted user information from a user profile, acquiring information regarding the tax event, comparing the user information and the tax event information with requirements for tax deductions and credits offered by a government entity or taxing authority, and identifying deductions or credits that have requirements related to or corresponding to the user and tax event information. In embodiments of the present invention, the user information comprises the user's occupation, the user's past tax returns, the user's city, county, state, and country of residence, the user's marital status, information regarding the user's spouse, the user's past income, the user's predicted income, the user's past tax bracket, the user's current tax bracket, and other information germane to determining tax benefits and liabilities based on the user's information. The tax event information comprises any information germane to determination of the tax implications of the event, including, without limitation, an amount of a purchase or investment, a category of a purchase or investment, if applicable, and an amount already paid or invested.

Additional embodiments of the present invention broadly comprise determining a probability that the user will qualify for a deduction or credit based on both known and predicted user information, the tax event information, and the requirements for tax deductions and credits for the current year. Using known and predicted information about the user, embodiments of the present invention also comprise determining an amount by which the deduction or credit may raise or lower the user's tax liability for the current tax year at an intermediate time in the current tax year.

Embodiments of the present invention also broadly comprise determining the user's overall tax liability at an intermediate time in the current tax year and a probability of an accuracy of such prediction. The prediction of the user's tax liability is at least partially dependent on both known and predicted user information, including prior year tax information, prior tax deductions and credits, known tax information for the current tax year, and demographic information for the user, and tax rules and regulations.

BRIEF DESCRIPTION OF THE DRAWINGS

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Embodiments of the present invention include a method, a system, and a computer program for predicting, at an intermediate time in a current tax year, how a particular purchase, action, or other "tax event" will affect a user's tax liability for the current tax year. Further embodiments of the present invention are operable to predict, at an intermediate time in the current tax year, the user's tax liability for the current tax year.

The prediction provided to the user may include at least one of a type of deduction or credit and an amount by which the tax event affects the user's tax liability. The prediction may be made at any point or time in the current tax year, defined as an intermediate time in the current tax year, such as at a POS of a purchase or in conjunction with the tax event.

The "current tax year" is defined herein to include January 1 of the calendar tax year at issue through at least December 31 of that same calendar year, and may also include, as applicable, the period from January 1 of the immediately following calendar year through the date of the legally mandated tax filing deadline for the calendar tax year (e.g., April 15th).

In embodiments of the present invention, the prediction is based on both known and predicted user information. The known information includes user information related to the user and their taxes, including the user's tax information, and regarding at least a portion of at least one prior tax year and information to date within the current tax year. As more information is known, whether it is additional information for at least one prior tax year, additional years of tax information, or more tax information within the current tax year, a probability of an accuracy of the prediction will likely increase. However, because embodiments of the invention base the prediction of tax liability on a variety of factors, as discussed herein, the predictions can be made with a high degree of accuracy.

Predicted user information includes tax information predicted for a remainder of the current tax year. For example, the user's income to date may be known while the user's income for the remainder of the tax year may be predicted. In embodiments of the present invention, stored information regarding the user, including the user's known tax information, tax rules, and/or purchases made by the user, are analyzed to determine if the user should be prompted to input additional information to determine the impact of the purchase.

In even further embodiments of the present invention, based on known and predicted user information, purchases or actions can be suggested to the user for maximizing the user's tax benefits.

Figure 1:
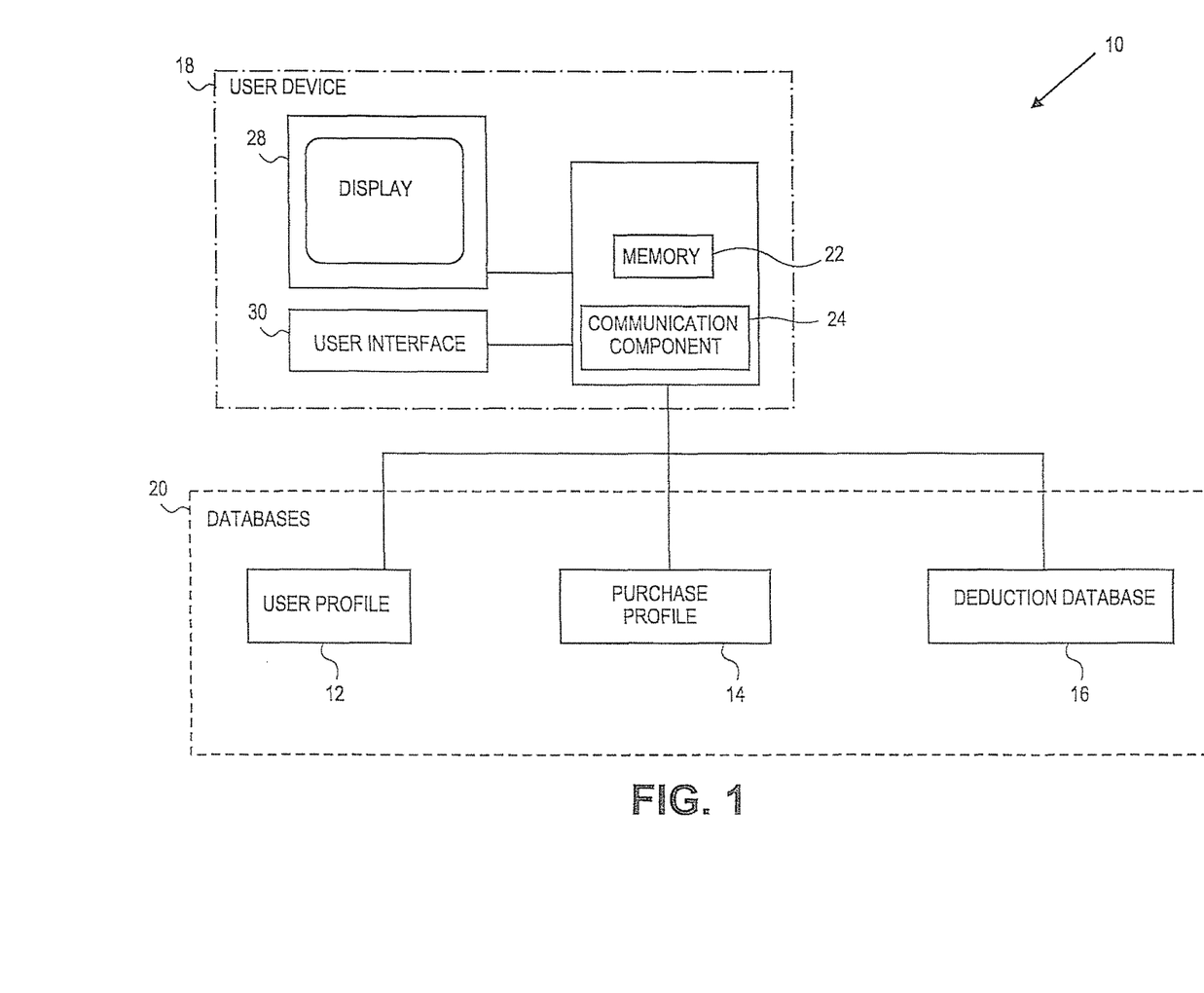
FIG. 1 is a system for determining tax benefits of a purchase constructed according to an embodiment of the present invention.

System Description:

FIG. 1 illustrates a system 10 configured for predicting the affect or impact a purchase will have on a user's tax liability. The system 10 is configured for receiving, accessing, and/or creating a user profile 12 and a tax event profile 14. The system 10 is also configured for comparing the user profile 12 and the tax event profile 14 with a deduction database 16 comprising a plurality of tax deductions and/or credits and their corresponding eligibility requirements and rules. Based on this comparison, the system 10 can determine one or more relevant deductions or credits, a probability that the tax event qualifies for the relevant deductions or credits, and/or an amount by which the deduction or credit is predicted to raise or lower the user's tax liability. This allows the user to determine the tax benefits of a particular tax event at a POS (if it is a purchase, for example) or at an intermediate time during the same tax year as the tax event.

The types of tax events affecting the user's tax liability are numerous and include purchases made by the user; actions taken by the user, such as investing in an IRA or 401(k), making a charitable donation, having a child, or reaching a particular birthday (such as the age when one can begin withdrawing without penalty from a 401(k)); and actions taken by others but affecting the user, such as the user receiving a raise. For ease of reference herein, embodiments of the present invention will be described with respect to a purchase of a good or service. However, it is to be understood that embodiments of the present invention can be used for predicting how any tax event will affect the user's tax liability for the current tax year and at an intermediate time in the current year.

The system 10, as illustrated in FIG. 1, comprises at least one user device 18 and one or more databases 20 that may be integral with or accessible by the user device 18. The databases 20 comprise the deduction database 16, one or more of the user profiles 12, and/or one or more tax event profiles 14 associated with one or more of the user profiles 12. The databases 20 and/or portions of the databases 20 may be stored on one or more memory elements located at one or more locations and accessible by the system 10.

In embodiments of the present invention, the user device 18, as illustrated in FIG. 1, is configured for receiving or accessing the databases 20 and purchase data and communicating to the user a type of deduction or credit, a probability of receiving a particular deduction or credit, and an amount by which the deduction or credit may lower the user's tax bill. The user device 18 may be any of a mobile communication device, a personal computer, a laptop, a mobile phone, a smart phone, a PDA, or other suitable devices. The user device 18 may comprise any number and combination of processors, controllers, integrated circuits, programmable logic devices, or other data and signal processing devices for carrying out the functions described herein, and may additionally comprise one or more memory storage devices, transmitters, receivers, and/or communication busses for communicating with the various devices of the system 10. In various embodiments of the invention, the user device 18 may comprise a memory element 22, a communication component 24, a display 28, and/or a user interface 30.

In embodiments of the invention, the user device 18 may implement a computer program and/or code segments of the computer program to perform some of the functions described herein. The computer program may comprise a listing of executable instructions for implementing logical functions in the user device 18. The computer program can be embodied in any computer readable medium for use by or in connection with an instruction execution system, apparatus, or device, and execute the instructions. In the context of this application, a "computer readable medium" can be any means that can contain, store, communicate, propagate, or transport the program for use by or in connection with the instruction execution system, apparatus, or device. The computer readable medium can be, for example, but not limited to, an electronic, magnetic, optical, electro magnetic, infrared, or semi conductor system, apparatus, device or propagation medium. More specific, although not inclusive, examples of the computer readable medium would include the following: a portable computer diskette, a random access memory (RAM), a read only memory (ROM), an erasable, programmable, read only memory (EPROM or flash memory), and a portable compact disk read only memory (CDROM), and combinations thereof.

The computer readable medium and the computer program embodied thereon may be remotely accessible by the user device 18, such as via a web browser over the Internet. The various actions and calculations described herein as being performed by or using the computer program may actually be performed by one or more computers, processors, or other computational devices, such as the user device 18 described herein, independently or cooperatively executing portions of the computer program.

The memory element 22 may be integral with the user device 18, stand alone memory, or a combination of both. The memory element 22 may include, for example, removable and non removable memory elements such as RAM, ROM, flash, magnetic, optical, USB memory devices, and/or other memory elements. The memory element 22 may store one or more of the databases 20 or profiles 12,14 described herein, code segments for accessing and using the databases 20 or profiles 12,14, and/or other data for instructing the user device 18 to perform the functions and methods described herein. The memory element 22 may comprise a plurality of memory elements located within the user device 18 and/or located at a plurality of locations and accessible remotely via the communication component 24.

The communication component 24 may comprise a wireless transmitter/receiver, antenna, or any other wired or wireless devices operable to send and/or receive data signals to and from the user device 18. For example, in some embodiments of the invention, the user profile 12, the purchase profile 14, the deduction database 16, and/or the computer program described herein may be stored in separate locations or in separate memory elements and may be accessible remotely, such as over the Internet. Thus, the communication component 24 may be configured for sending and receiving data regarding the user profile 12, the purchase profile 14, the deduction database 16, and/or tax-related data calculated or otherwise determined using the computer program.

The display 28 may comprise a graphical interface operable to display visual graphics, images, text, etc. in response to external or internal processes and commands. For example, the display 28 may comprise conventional black and white, monochrome, or color display elements including CRT, TFT, LCD, and/or LED display devices. The display 28 may be integrated with the user interface 46, such as in embodiments where the display is a touch screen display to enable the user to interact with it by touching or pointing at display areas to provide information to the user device 18. The display 28 may be coupled with various other components of the user device 18 and may be operable to display various information corresponding to the user profile 12, the purchase profile 14, the deduction database 16, the user's financial records, and/or data calculated by the user device 18 as described herein, such as a type of deduction or credit associated with a purchase, a probability of qualifying for a particular deduction or credit, and/or an amount by which the deduction or credit associated with the purchase may reduce the user's tax bill.

The user interface 30 may enable one or more users to share information and commands with the user device 18 or system 10, such as information about the user to populate the user profile 12, information about a purchase to populate the purchase profile 14, a copy of a receipt and/or a UPC associated with the purchase, or any other information useful in determining the user's eligibility for a tax deduction or credit and/or an impact a purchase may have on the user's total amount of taxes owed to the government. The user interface 30 may comprise one or more functionable inputs such as buttons, switches, scroll wheels, a touch screen associated with the display, voice recognition elements such as a microphone, pointing devices such as mice, touchpads, tracking balls, styluses, a camera such as a digital or film still or video camera, an optical scanner, and combinations thereof. The user interface 30 may also include a speaker for providing audible instructions and feedback. Further, the user interface 30 may comprise wired or wireless data transfer elements, such as the communication component 24, a removable memory, data transceivers, and a transmitter, to enable the user and other devices or parties to remotely interface with the user device 18 or the system 10.

User Profile Description:

The user profile 12 includes any user information germane to determining the affect of the tax event on the user's tax liability or the user's overall tax liability, including known and predicted information. The user profile 12 may be created by the user via the user interface 30 by obtaining information about the user from a plurality of sources, databases, or a combination thereof. For example, income information about the user may be entered via the user interface 30 and/or downloaded from the user's bank account, prior year(s) tax returns, financial management software, payroll software, or any other designated source. The user profile may include, but is not limited to, any of the following information: name, social security number, age, sex, address, country of residence, state of residence, state of employment, employer name and location, whether the user is self-employed, occupation/profession/trade, whether the user travels for their occupation, whether the user wears a uniform or uses a car for their profession, income, tax bracket, prior tax returns, prior deductions, medical/insurance coverage, number and age of dependants, education information, taxable property information, and investment information. The user profile may also include the user's marital status and/or any of the information listed above for the user's spouse, such as the spouse's income and occupation.

The user's occupation may include, for example, a teacher, a student, a job seeker, or a member of the armed forces. The user's income and tax bracket may be determined based on one or more of the following: user input, previous tax returns, year-end wage and tax statements, bank account information, payroll information, information obtained or downloaded from financial management software, and government-set tax bracket thresholds. The user's income information may include gross taxable income amounts for one or more previous years and/or a current year's projected/predicted income entered by the user or estimated via the computer program based on an amount of income received year-to-date. The tax bracket information may include the user's tax bracket for one or more previous years and/or a projected/predicted tax bracket of the user for the current year entered by the user or estimated by the computer program associated with or accessible by the user device 18. Education information may include if the user is a current student, if the user is currently paying student loan interest, how much student loan interest the user is paying, and what degree the user is seeking. Taxable property information may include the value or estimated value of the property owned by the user, amount of property tax paid on the taxable property, an estimated amount of property tax to be paid on the property for the current year, and an amount of tax-deductible interest paid or expected to be paid for the year. Investment information may include information regarding stocks, bonds, 401(k) contributions, IRA contributions, and other investments made and/or expected to be made by the user during the year.

Note that the user profile 12 may include any information about the user that may be relevant in determining the user's tax liability, including eligibility for a particular tax deduction or credit. As discussed below, embodiments of the present invention query the user to obtain information that is germane to determining tax liability, such as whether the user has any business-related expenses based on their occupation. Furthermore, as tax laws change, additional information may be required by the user profile 12 to determine the user's eligibility for a particular deduction or credit. Additionally, in some embodiments of the invention, the user profile 12 may include information about more than one user, such as a plurality of members in a household. For example, for married users filing a joint tax return, the user profile 12 may include income and employment information for both a husband and a wife.

In embodiments of the present invention, the user profile 12 is supplemented throughout the tax year as additional information regarding the user becomes available or is learned by the computer program.

Tax Event Profile (Purchase Profile) Description:

The tax event profile 14 may include a plurality of information regarding a past, current, or future tax event, such as a purchase or other action, affecting tax liability. By determining a tax benefit of a contemplated purchase or action, the user may determine whether or not they want to make the purchase or take the action. The tax event profile 14 may encompass one or more purchases or events.

For ease of reference, the tax event profile 14 will herein be referred to as a purchase profile 14 for use with a purchase. However, as can be appreciated, if the tax event is an action, the tax event profile 14 will include information associated with the action, as opposed to associated with a purchase.

Embodiments of the present invention allow for a plurality of methods of inputting information regarding a purchase into the purchase profile 14. Such input methods include inputting manually via the user interface 30; downloading from a digital receipt; detecting from a digital receipt or a digital image of a physical receipt (for example, optically scanned or photographed); retrieving (such as via a look-up table) or downloading based on a UPC entered by the user or obtained from an image of a bar code on the receipt; downloading from a terminal at a POS; e-mailing from a POS terminal and to the user's account associated with the computer program of the present invention or to the user and then downloaded to the purchase profile 14; or downloading from a financial institution or financial management software. For example, the user's records from a financial institution or financial management software may be filtered via a computer program associated with or accessible by the user device 18 to identify and/or tag purchases corresponding with a particular category, such as a medical expense, work-related, education-related, or any other category that may have tax implications. A tag, as defined herein, may be any stored indicator that a particular purchase or purchase profile belongs with a particular category. In some embodiments of the invention, a purchase may be tagged automatically or tagged by user selection, as described below. The purchase profile may be created for each of the relevant purchases found in the particular category and used as described herein to determine a relevant deduction or credit associated with the purchase.

In embodiments of the invention, information on a receipt may be interpreted via the computer program associated with or accessible by the user device 18 based on product codes listed on the receipt and a store or retailer name listed on the receipt. If a plurality of products are listed on a single receipt, but only some of the products are relevant for tax deductions or credits, the non-relevant products may be omitted from the purchase profile 14 or grouped together in a separate purchase profile. Furthermore, if items on a single receipt are related to different types of deductions, the items may be grouped into separate purchase profiles according to one or more purchase profile parameters. If a plurality of purchase profiles are created for a plurality of purchases that are each later determined to relate to the same deduction or credit, these purchase profiles may be merged together by the user or automatically via the computer program described herein.

The purchase profile 14 may include, but is not limited to, any of the following information: name of item or service purchased, date and/or time of purchase, location of purchase (i.e., merchant or retailer name and/or location), category or purpose of purchase (i.e., medical expense, business/work-related expense, charitable contribution, product specific), description of purchase (may include key words to search, a merchant code, a UPC, and/or a bar code), and amount of the purchase. In some instances, the amount of the purchase may separately include a sales price and an amount of sales tax paid on the purchase. When populating the purchase profile 14, the user may be provided with a list or drop-down menu of deductible products or categories that correspond to the information being entered by the user. The user may select from a menu of categories and/or products to properly identify the purchase and then enter the amount spent on the purchase.

It is to be appreciated that in instances where information regarding the purchase is downloaded from a digital receipt, detected from a digital image, downloaded based on a UPC, or otherwise automatically entered, then the user is not required to manually enter the amount spent on the purchase or other information otherwise known via the download. Similarly, in embodiments of the present invention, the user may request or allow for the receipt to be downloaded automatically to the user's mobile wireless communications device and to an application running the computer program of the present invention. For example, the user's mobile device may be operable to access the application, which comprises at least a portion of the code segments of the computer program. At the POS, the user may download the receipt or purchase information to the application, thus allowing the user to tag, itemize, or otherwise categorize the purchase at the user's convenience. Allowing the user to categorize the purchase as close to the POS as preferable for the user assists in preventing the user from forgetting to categorize the purchase or miscategorizing. Additionally, the user does not have to download the receipt at a later date. Downloading the purchase information to the user's mobile device could be performed through known communications means, including Bluetooth, WiFi, the Internet, RFD, etc.

In even further embodiments of the present invention, once the receipt is downloaded to the purchase profile 14 of the computer program, the receipt is matched to an incoming transaction on the user's financial management software. For example, the computer program of the present invention may download the user's financial transactions from the user's bank account. Because the receipt is stored in the purchase profile 14 accessible by the computer program, the program matches the receipt to the particular financial transaction. Such matching could be performed using various identifying criteria, including an amount of the financial transaction as compared to a known amount associated with the receipt and a merchant name received via the downloading of the financial transaction as compared to a known merchant name associated with the receipt. Thus, embodiments of the present invention periodically match the downloaded financial transactions with downloaded receipts. Such matching could be performed upon downloading the financial transaction, upon downloading the receipt, upon manual instruction by the user, or at predetermined time intervals, such as once a week.

Further, if the user tagged or otherwise itemized the downloaded financial transaction, the receipt is automatically stored with the tagged information. Therefore, a search of all business related expenses within a particular time period would locate any receipts tagged as business related expenses.

Deduction Database Description:

The deduction database 16 may comprise a list and description of a plurality of tax deductions and credits offered by one or more governments (e.g., state, federal, and local) or taxing authorities. Furthermore, eligibility rules and requirements for each of the deductions and credits may be stored in the deduction database 16. If the tax event is a purchase, the rules and requirements may correspond with a specific product purchased, a category of the product purchased, an amount of the purchase, the user's medical/insurance coverage and an itemization threshold, the purpose of the purchase, the date of the purchase, the amount of sales tax paid on the purchase, income of the purchaser, age of the purchaser, location of the purchase, profession of the user, and/or the user's prior tax returns and/or deductions. For example, a record in the deduction database 16 may describe an eligible category, one or more eligible products or items, a list of eligible organizations, and/or other rules or requirements for a qualifying deduction or credit. In contrast, if the tax event is an action, such as investment in a 401(k) or a birthday, the rules and requirements may correspond to non-taxable limits for 401(k) investments or a date on which the user may begin withdrawing invested funds without penalty. As such, it is to be appreciated that the deduction database includes all rules and regulations affecting whether the user can take the deduction or credit based on the user and tax event information contained in the user and tax event profiles.

The rules and requirements for credits and deductions may be published by one or more governments via various government bureaus or other taxing authorities, such as the Internal Revenue Service (IRS) in the United States, and may be entered into the deduction database 16 and/or periodically updated by a provider or author of the computer program described herein.

Operation of the Computer Program:

In use, the computer program stored on the computer readable storage medium associated with and/or accessible by the user device 18 may be executed to compare information in the user profile 12, the purchase profile 14, and the deduction database 16 and identify deductions or credits applicable to the purchase or purchases.

Figure 2:
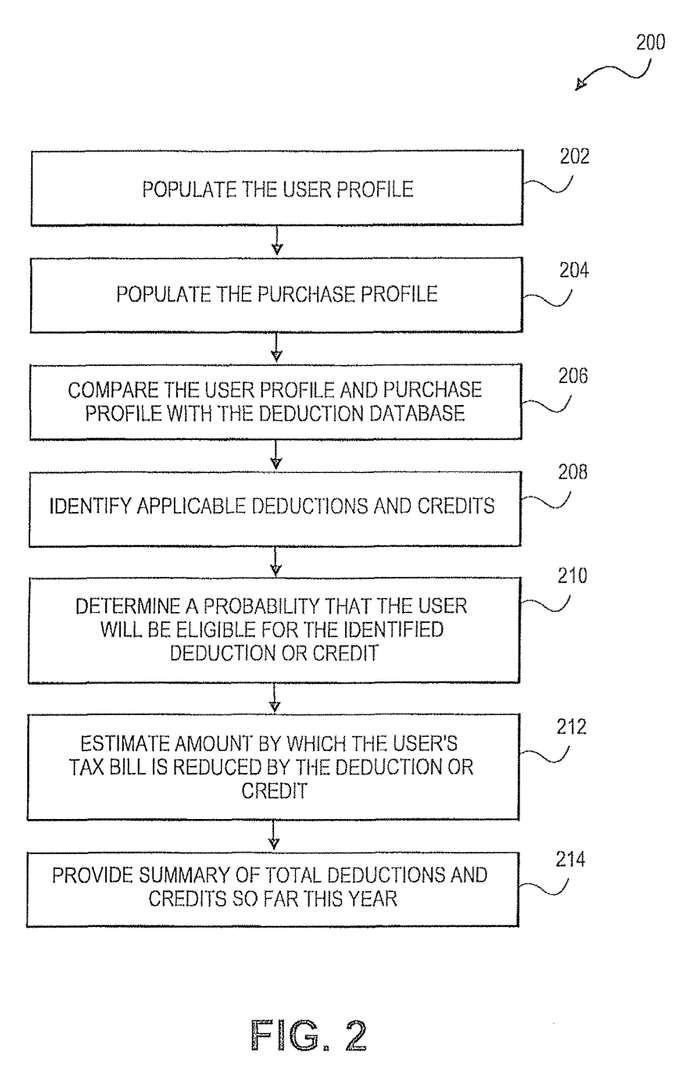
FIG. 2 is a flow chart of a method of determining tax benefits of a purchase according to an embodiment of the present invention.

The flow chart of FIG. 2 depicts the steps of exemplary methods of the invention in more detail. In some alternative implementations, the functions noted in the various blocks may occur out of the order depicted in FIG. 2. For example, two blocks shown in succession in FIG. 2 may in fact be executed substantially concurrently, or the blocks may sometimes be executed in the reverse order depending upon the functionality involved.

FIG. 2 illustrates a method 200 of determining tax benefits associated with one or more purchases. The method 200 may comprise populating the user profile 12, as depicted in step 202, and populating the purchase profile 14, as depicted in step 204. For example, upon a first use of the computer program, a plurality of information about the user and one or more purchases may be requested via the user device 18 to populate the user profile 12 and the purchase profile 14. The computer program may provide a brief, guided interview to determine if an item purchased is deductible and/or provide decision tree logic to assess if an item is deductible. Additionally, the computer program may be configured to download various user and purchase information from various locations, such as financial management software, tax software, a POS terminal, and digital or imaged receipts. Alternatively, the code segments comprising the features of the present invention may be incorporated in financial management software or tax software. Once the user profile 12 is created, it may be stored and accessed throughout the year for determining credits or deductions associated with new purchases. The user profile 12 may also be periodically updated throughout the year by the user and/or via automated downloads of financial statements from financial institution websites or financial management software.

The computer program may additionally comprise and/or be configured to access a search engine, thereby allowing keywords entered by the user to be located within the deduction database 16 and/or various portions of the computer program. For example, a category of a purchase, a profession, and/or an item purchased may be located in the deduction database 16 via a keyword search or selected from a menu of options.

The purchase profile 14 may be created before a purchase or transaction, simultaneous to or in conjunction with the purchase at a POS, and/or after a purchase has been made using receipts, bills, or financial records. To determine how a future purchase could affect their taxes, the user may input various information about the future purchase, such as price, type of purchase, predicted date of purchase, location of purchase, or the product or service provider. Some or all of this data may be uploaded from various locations, such as websites, scanned images of sale ads, catalogs, and other sources providing service or product information.

Creating the purchase profile 14 at the POS may include obtaining digital images of the purchase, bar codes, or UPCs at the store or downloading purchase information from a POS terminal using the communication component 24 of the user device 18. Furthermore, the user may manually input information regarding the purchase at the POS via the user interface 30. Additionally, if different items purchased at one store fall under different categories (e.g., groceries and school supplies may be purchased at a single retailer), the user may select an option to tag each of the items individually according to their applicable category. As noted above, tagging a plurality of items purchased in a single transaction at the POS (or shortly thereafter) allows the user to properly categorize each item while its purpose is still fresh in their mind.

Creating the purchase profile 14 after the purchase has been made may include any combination of the methods described above. For example, the user may input a transaction via the user interface 30 or download one or more transactions via financial management software or websites. Additionally or alternatively, the user may optically scan physical bills or receipts or download digital bills or receipts, such as those received via email. Furthermore, the purchase profile 14 may be populated using the plurality of methods described above. For example, a purchase profile created from a transaction downloaded via some financial management software may simply indicate a check for a particular amount was deposited by the payee on a particular date. However, the user may add to the purchase profile by inputting what item was purchased, what date the item was purchased (date check was written), and the name of the retailer or payee. Furthermore, the purchase profile 14 may be edited or amended as needed. For example, a purchase profile 14 may be created at the POS but edited or amended at a later time or date.

The user profile 12 and the purchase profile 14 may be compared with information stored in the deduction database 16, as depicted in step 206, and may identify applicable deductions and/or credits associated with the user and the purchase, as depicted in step 208. For example, a code segment of the computer program may be executed to determine if the purchase is a credit, a deduction, or both. A list of suggested deductions or credits may be provided to the user if an exact match cannot be found in the deduction database 16. In some instances, a deduction or credit must match a plurality of user and purchase criteria to be considered applicable. For example, some deductions or credits must correlate with both the user's occupation and the type of product or service purchased. Additionally, in some embodiments of the invention, the deduction or credit corresponding with the user's occupation and type of purchase may only be provided to the user if their income or projected income is below a particular threshold.

Many deductions are category-specific deductions. Thus, in embodiments of the present invention, the computer program uses a plurality of already-known user information and purchase information to automatically tag or categorize a purchase. For example, if it is known that the user is a job seeker and they made a purchase from a copy provider, such as Kinko's®, the computer program may automatically tag the purchase as a work-related or job search related expense. Additionally or alternatively, the computer program may be prompted to ask the user if the purchase was a job search related expense. The tags or categories assigned to each purchase or purchase profile can be used to identify associated deductions or credits.

In embodiments of the present invention, the computer program may comprise or have access to a list of common or well-known retail and service providers identified as being associated with one or more categories. Thus, when a purchase is made from a retail or service provider on this list, the computer program may automatically tag the purchase according to the provider's associated category. Additionally or alternatively, the computer program may be configured to prompt the user for additional information based on the tag or category automatically assigned to the purchase and/or other information about the user.

For example, if the user is a teacher and purchases items from an office supply store, the computer program may be prompted to display the following question: "Is this a classroom expense?" In another example, if a user has no dependents, according to the user profile 12, but the user's financial records show an amount given to an elementary school, the computer program may display the following question: "Is this a charitable contribution?" Thus, embodiments of the present invention actively prompt the user for information regarding a purchase based on known user and/or purchase information.

Figure 3:
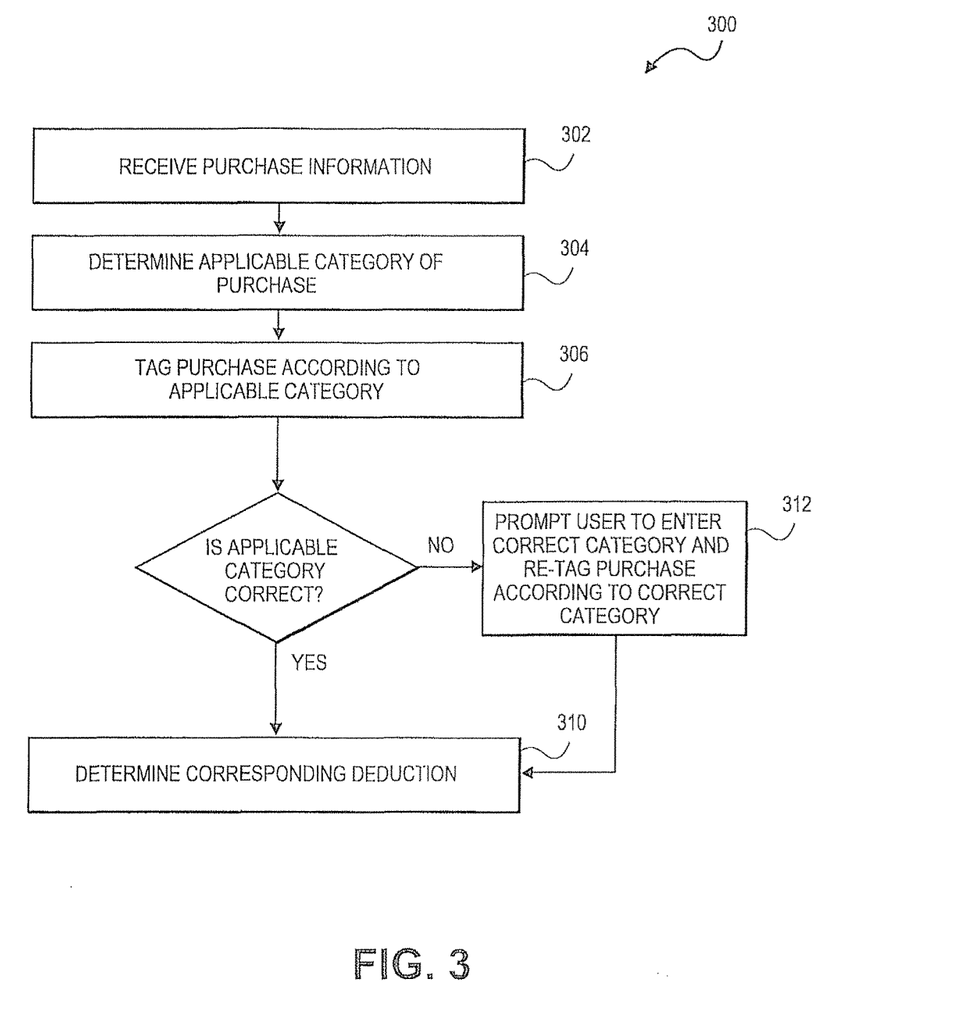
FIG. 3 is a flow chart of an automated method for categorizing purchases to determine associated deductions.

The computer program may use a plurality of rules and thresholds to recognize trends regarding the user and the user's purchases and to determine appropriate questions to ask the user or an appropriate tag to apply to a purchase. An exemplary method 300 of analysis to determine if the user should be prompted to provide additional information is illustrated in FIG. 3. Code segments for executing the method 300 may be included in the computer program, as described herein.

The flow chart of FIG. 3 depicts the steps of exemplary methods of the invention in more detail. In some alternative implementations, the functions noted in the various blocks may occur out of the order depicted in FIG. 3. For example, two blocks shown in succession in FIG. 3 may in fact be executed substantially concurrently, or the blocks may sometimes be executed in the reverse order depending upon the functionality involved.

The method 300 may comprise receiving purchase information, as depicted in step 302. Receiving purchase information may include, for example, receiving purchase information from the purchase profile, receiving a transaction via financial management software, or receiving a bill, receipt, or other record of purchase. As depicted in step 304, the computer program may then determine an applicable category of purchase using purchase information, user information, or a combination thereof.

Next, the computer program may tag the purchase according to the applicable category, as in step 306, and/or prompt the user to confirm whether or not the applicable category applies to the purchase, as depicted in step 308. For example, if the user's occupation is listed as a driver of a commercial vehicle and the user inputs a purchase receipt from a gas station, the computer program may be prompted to ask the user the following question: "Is this a work-related expense?" If the user confirms that the applicable category does apply to the purchase, then the computer program may determine a corresponding deduction, as depicted in step 210. If the user indicates that the applicable category does not apply, the computer program may prompt the user to enter a correct category, as depicted in step 212. For example, a selectable list of other category options may be provided to the user. Once the correct category is entered by the user, the computer program may execute step 210 as described above.

Historical user information regarding the user and the user's expenses over multiple years may be used to identify trends via the computer program. For example, if the user has a college-aged child and has made periodic payments to a particular university for the past two years, a new payment to this university may prompt the computer program to ask the user, "Is this an educational expense?" However, if the user does not have any college-aged children and is not currently a student, a payment to this university may prompt the computer program to ask the user, "Is this a charitable donation?" Similarly, the user profile may be populated with information regarding the user's previously-attended schools. When the new payment to one of the previously-attended schools is recognized, the computer program of embodiments of the present invention tags the payment as a charitable donation or asks the user if it is a charitable donation. These types of prompts for additional information from the user can be used by the computer program to obtain information necessary to determine an applicable deduction or credit.

Users are likely to submit purchases to the computer program that they believe may be deductible but may inadvertently omit other deductible purchases because they assume they would not be deductible. To prevent this inadvertent omission, the computer program may ask the user to enter additional expenses, purchases or purchase profiles corresponding to the user profile 12, or previous purchases entered by the user. For example, if the user profile 12 indicates the user is unemployed or conducting a job search, the user may be asked to provide information regarding any travel or telecommunication expenses related to the job search. The user may also be provided with a list of selectable services related to job searches, such as resume advisor, copy services, postage, and/or courier services. Furthermore, the user may request additional information related to job search deductions, such as whether a suit purchased for an interview is a deductible expense. Alternatively or additionally, the user may be prompted by the present invention as to whether a purchase from a clothing store includes any job related expenses.

In embodiments of the present invention, if purchases are tagged or otherwise indicated to fall into a particular category, a code segment of the computer program may be executed to prompt the user to provide additional category-related information. For example, for the category of volunteer or charity donations or expenses, the user may be prompted to name the organization, and the computer program may be used to determine if the organization is listed in the deduction database 16 as a qualifying organization. The user may also be asked if they incur expenses for supporting the qualified not-for-profit organization, are a member of a board for the qualifying organization, have made direct donations for the qualified organization, donated goods such as clothing and household items, maintained an office at home for the qualifying organization, traveled on behalf of the qualifying organization, and/or incurred telecommunication expenses related to the qualifying organization.

Another example of category-specific information that may be requested via the computer program is information related to medical or health expenses. For example, the following information may be requested, accessed from the user profile 12, and/or calculated using various code segments of the computer program:
  Does the user have circumstances that would qualify as medical & health related expenses?
  What is the user's income (last year's tax return)?
  Does the user have employer sponsored health insurance (yes/no)?
  Does the user directly pay for individual/family health insurance coverage, such as COBRA (yes/no)?
  How much are the user's monthly health insurance premiums? Has the user's annual medical expenses exceeded the IRS threshold for deducting medical expenses?

In embodiments of the present invention, the user can also ask questions to be answered via the computer program. Various code segments of the computer program may be executed to retrieve or calculate responses to a variety of specific user requests, questions entered into a search engine, or questions selected from a menu by the user. Exemplary, although not exhaustive, questions include the following:
  What is the difference between a deduction and a credit?
  Can some purchases, such as new windows, qualify for both a deduction and credit?
  What energy tax credits are currently available?
  What profession/trade-specific tax credits are available to my profession?
  I have a home workspace; what qualifies as a deduction and how do I document this?
  Are my utility and telecommunications bills for home workspace deductible?
  How much could this save on my tax bill?
  How much sales tax have I incurred this year and will I exceed the standard sales tax deduction?
  I'm a teacher; can you tell me more about deductions or credits for classroom related expenses?
  What else could I buy that would qualify as a deduction and how much would I save on my tax bill?
  Tell me when and where there are sales tax holidays so I can maximize my savings with a deduction and a reminder to my calendar.
  What qualifies as tax free on the sales tax holiday in this location and how much could I save in addition to deductions?
  Import all of the deductions saved on my account into my tax return.

Some embodiments of the invention also comprise one or more code segments of the computer program executable for determining a probability that the user will qualify for the deduction or credit, as depicted in step 210. The probability of being eligible for the tax deduction or credit may be displayed as a percentage value on the display 28. In other embodiments of the invention, if the probability is above a first particular threshold, the user device 18 may indicate to the user that the purchase is eligible for the deduction or credit. If the probability is below a second particular threshold, the user device 18 may indicate to the user that the purchase is probably not eligible for the deduction or credit. If the probability is between the second and first thresholds, then the user device 18 may indicate to the user that the purchase may be eligible for the deduction or credit. For example, the probability of eligibility for the deduction or credit may be classified using weighted thresholds: Yes (90% to 100%) Maybe (40% to 89%) or Not Likely (less than 40%). A general indication of "yes," "no," or "maybe" may be provided on the display 28 and/or via the user interface 30 in a variety of ways using any combination of words, phrases, symbols, colors, sounds, etc.

In some embodiments of the invention, a user may receive a message via the user device 18 indicating they are "maybe" eligible for the deduction or credit, due to incomplete information in the user profile 12 and/or because a current tax year is not yet over and an end-of-year total of purchases or income is required to calculate whether or not the user meets a particular threshold for the credit or deduction. For example, the accuracy of the probability at a later time within the current tax year will likely be higher than early in the tax year. For a more precise answer, a variety of assumptions and estimations based on the user profile 12, including known tax information related to the user for prior tax year(s), previous tax deductions or credits taken, and known tax information related to the user for the current year to date, and/or various statistical norms for the user or various segments of the taxable population, may be used to predict a probability that the user will receive the credit or deduction. Additionally, the above-listed information, either alone or in combination, can be used to predict the user information for a remainder of the current tax year, thus supplying the computer program of the present invention with further information for predicting the probability that the user will receive the credit or deduction.

For example, if the user has qualified for deducting a certain portion of medical expenses for the past two tax years, then the probability of the user being able to deduct a medical expense, even at the beginning of the current tax year and without knowing the remaining medical expenses for the current tax year, may be "yes." However, if the user has not been able to deduct medical expenses for prior tax years, then the probability may be "not likely." The combination of using known information (e.g., amount of the purchase, type of purchase, prior year tax information, income made thus far, amount of taxes taken out of the user's paychecks thus far, etc.) with predicted information (e.g., predicted income, predicted tax bracket for the year, predicted amount of taxes taken out of the user's paychecks for the remainder of the year) allows the user to keep a more accurate running total of deductions or credits throughout the year.

In some embodiments of the invention, predicted user information, such as predicted income, may be assigned a probability of accuracy based on a variety of factors, such that the probability of receiving a particular credit or deduction may be based on the probability that the predicted user information is accurate. A probability of accuracy may be based on long-term trends, user-provided information, and/or how much of the year's income has been tracked thus far (e.g., a projection of annual gross income may be more accurate in November than in February). For example, if a particular deduction is at least partially based on falling below an income threshold, the user has not received more than a 5% raise in each of the past five years, and the user's income is 50% below the income threshold for the deduction, then the user has a high probability of being eligible for the deduction. Therefore, in this example, the user may be provided with information indicating that he/she is maybe or probably eligible for the deduction.

If a particular deduction is indicated to be deductible or may be deductible, an amount by which the credit or deduction may lower the user's tax liability may be calculated via various code segments of the computer program, as depicted in step 212, using the amount of the purchase, limits or rules associated with the deduction or credit, and information from the user's profile about his/her income or tax bracket. The amount by which the deduction could reduce the user's tax bill may be calculated using deduction rules stored for each deduction in the deduction database 16. For example, the amount by which the deduction could reduce the user's tax bill may be a flat percentage of the purchase price, an entire amount of the purchase price, an amount of the purchase over or under a particular threshold, an amount equal to the sales tax paid on the purchase, or any other amount set by government tax rules. If any special rules or limits are specified in the deduction database 16, one or more code segments of the computer program may be executed to determine how much more the user could reduce their tax bill by taking certain actions to maximize their deductions in this category and then provide this information to the user via the display 28 or user interface 30. The user device 18, via the computer program, may also identify, save, and/or display any relevant content associated with the credit, deduction, or deduction category.

It is to be appreciated that some tax events may increase the user's tax liability. Consider a scenario where the user receives a small raise one year that changes the user's tax bracket or otherwise disqualifies the user's ability to take certain deductions. For example, if the user's income is close to a threshold amount for taking a student loan interest deduction, then the raise may actually increase the user's income to an amount where the user is disqualified from taking the deduction. In such a case, it may be that the raise is actually less money than the loss from being able to take the student loan interest deduction, such that the user actually pays more taxes. As such, embodiments of the present invention allow for the user to input the proposed raise and to determine the impact of this tax event on the user's overall tax liability by accounting for the user and tax event information.

Furthermore, based on the comparison of the user profile 12 and the purchase profile 14 with data stored in the deduction database 16, various code segments of the computer program may be executed to output any of the following information to the user via the display 28 or user interface 30: a description of matching deductions or credits, a qualification answer (i.e., Yes, Maybe, Not Likely), eligible amount of the deduction or credit (i.e., dollar amount or percentage of transaction), amount the tax benefit could reduce the user's tax liability, information on how the user can maximize tax benefits in this category, and links to additional relevant content on tax benefits in this category.

In embodiments of the present invention, the computer program recommends purchases to maximize the user's tax deductions or credits based on user and/or purchase information. For example, if the user previously deducted their computer as a business expense, but the computer has depreciated below a particular threshold, the computer program may recommend that the user should buy a new computer. Furthermore, the user may ask the computer program to recommend purchases for maximizing the user's tax deductions. In an exemplary embodiment of the invention, the user may ask, "Are there any purchases you would suggest for my situation that would qualify for a deduction?" and the computer program may be used to compile a list of suggestions based on the user profile 12, the user's purchases and deductions thus far, and information in the deduction database 16. For example, the suggestions may include the following:

"Buy more office supplies and deduct them; it could save another $80 on your tax bill."

"Buy a new laptop. You could capitalize the entire expense up front this year and it will save $120 on your tax bill."

"Buy a qualifying automobile and take advantage of the energy tax credit and opportunity to deduct the sales tax."

"Invest more in an IRA, because your tax bill is predicted to be higher for the current tax year than last year."

In embodiments of the present invention, the computer program may be programmed to suggest purchases from specific retailers based on advertising partners associated with the computer program provider. For example, office supplies from a specific office retailer may be suggested.

The user may be provided with an option to save the deduction/credit to a user account along with a description. In addition to saving the deduction or credit, the user may digitally or electronically attach or link evidence of a deduction, such as a photo/scan of a receipt or bill or an automatically-imported receipt from a financial partner, to the saved deduction. In embodiments of the invention, a threshold requirement for documentation or evidence of the purchase associated with the deduction or credit may be provided by the deduction database 16. For example, some deductions may require a receipt, a bill, or an invoice for the purchase. Some deductions have special rules or limits, such as a classroom teacher deduction of up to $250, which does not have to be itemized.

The saved deduction and credit information may be accessed via various code segments of the computer program to provide information regarding total deductions or credits identified year-to-date. This may require calculating or estimating what the user's income will be for the entire year based on the previous year's income and/or income received thus far in the current year. Additionally or alternatively, the user may provide a predicted gross income for the year. This enables a mid-year evaluation, i.e., an intermediate evaluation at any time throughout the current tax year, of the user's overall tax liability for the current year, which may be used by the computer program to recommend purchases or actions that the user could take to reduce his/her tax liability before the end of the year. For example, the user may ask or select the following question or option from a menu of questions: "What are my total deductions this year and how much will it save on my tax bill?" Then the computer program may be used to calculate these values and provide an answer to the user, such as the following via the display 28: "Your total deductions so far this year are $5,431 and this could reduce your tax bill by $2,645. Compared to other users in your category, you are very effective at maximizing your deductions. Keep up the good work."

Furthermore, a summary report of the user's total tax benefits saved within a current year thus far may be provided, as depicted in step 214, including any of the following information: total credits, total deductions, total number of "yes" (i.e., it is a deduction), total number of "not likely" (i.e., it is probably not a deduction), total number of "maybe" (i.e., it may be deductible), amount by which total deductions reduce the user's tax bill, amount by which total credits reduce the user's tax bill, amount of occupation-related deductions, amount of medical-related deductions, amount of charitable-related deductions, and amount of any other particular deduction or credit categories.

In some embodiments of the invention, summaries and advice provided to the user may be based on an analysis of one or more purchase profiles related to a particular category, such as medical expenses, and the user profile 12. The computer program may then be used to determine the probability of a deduction or credit and advise whether the user should track expenses or purchases in this particular category. Some categories (e.g., medical) have a minimum based on the user's adjusted gross income. Thus, some purchases would only be of interest if the user's receipts as a whole for a category add up to move than 7.5% of their adjusted gross income or the rule otherwise in effect at the time of the tax scenario.

The deduction or credit and any information associated therewith may be imported into or used by various financial management and/or tax preparation software programs or databases. For example, a tax professional may import the user's deductions and review them along with the user's tax returns. Specifically, the tax professional or software may determine if the saved deductions or credits are allowable or not allowable, as well as providing a explanation of that determination. The user may also print reports of his/her predicted tax benefits. Furthermore, the user may print a receipt cover sheet to attach to purchase receipts for filing and record-keeping purposes.

The following are non-exhaustive examples of ways in which the computer program of embodiments of the present invention may be used to predict how a tax event will affect the user's tax liability and/or identify possible deductions. Note that other menu options and commands may be executed using the computer program described herein without departing from the scope of the invention.

EXAMPLE 1

This example situation describes a user on a smart phone, such as an iPhone® or similar wireless mobile communications device, who wants to type in a description of an item to find out of if the item is deductible and how much it will save on their tax bill. The user has set up the user profile 12 on their account and provided information about themselves, as described above. This information can then be used to evaluate eligibility for a deduction. The user has also installed and set up the computer program, such as a smart phone application (or "app") on their smart phone or other mobile communications device, and launched it.

The first step of this example method is opening or accessing the computer program. When the computer program is selected to be opened, the smart phone displays a menu of functions, including: Find Deductions; Review Saved Deductions; My Account; and Learn More About Deductions. Next, the user selects "Find Deductions," which results in the smart phone displaying a menu of Deduction Categories, including: Business/Work Related; Charitable; Medical; and Special Purchase.

The user then selects the Business/Work Related category, resulting in the smart phone displaying the following: a text box allowing the user to type in a search phrase describing the deduction, a text box allowing the user to enter an amount, a check box to indicate if it is an un-reimbursed expense (this box may default as checked); and a Submit Deduction search button. In this example, the user may enter the word "book" into the search phrase text box, enter the amount "$35," check the box to indicate the item was not reimbursed; and presses the Find Deduction search button. In some embodiments of the invention, a text box may also be provided to allow the user to enter a description of the item to be saved later. The information entered into the Business/Work Related category may populate the purchase profile 14. Specifically, the smart phone may submit the deduction information (category, search phrase, amount, description, reimbursement indicator) to be processed via a code segment of the computer program for comparison with the user profile 12 and/or the deduction database 16.

One code segment of the computer program may be used to evaluate work related/professional context of the purchase. Because the user chose the "Business/Work" category, the computer program instructs a check of an "occupation" entry in the user profile 12 and determines that the user is a qualifying teacher employed full time. As a result of the user being a teacher, another code segment of the computer program is executed for evaluating the search term against a list of ordinary and necessary items that can be deducted by a teacher and for determining that the purchase is a qualifying deduction item. A rule that places a $250 deduction limit on qualifying education expenses is listed in the deduction database 16 under deductions related to teachers. Therefore, to determine if this limit has been reached, another code segment of the computer program is executed to check the user profile 12 and the total amount of deductions already saved as a "Classroom Teacher Deduction." The results output to the user in this example include: Total Classroom Teacher Deduction? $25; Qualification Limit? No; Total Teacher Deductions Saved So Far? $62; and Eligible Amount Remaining? $189.

Next, a possible value of the deduction may be determined using the computer program. Using income information from the user profile 12, a code segment of the computer program is executed to evaluate the predicted amount by which the deduction could reduce the user's tax liability. The user profile 12 lists the user's tax bracket as 25% and the deduction or purchase amount as $36.00. The output of the deduction value provided to the user is $8.75. This value may be displayed on the display 28 and/or saved to the user profile 12 or the memory element 22.

If the user's tax bracket is unknown, ranges of deduction values may be provided based on one or more predicted tax brackets. Alternatively, the user's adjusted gross income and/or tax bracket from a previous year's return may be used to estimate the deduction value.

In the example provided above, the following summary regarding the $36.00 work-related purchase may be displayed on the display 28:

It's Deductible!
Deduction Amount=$36
Reduces Your Tax Bill by=$8.75
Special Content with link to "Learn More" article
Capture My Receipt button Cancel button In addition, the smart phone may display the following special content: "Teachers may deduct up to $250, reducing your tax bill by $61 for classroom related expenses. You can spend another $189 on your classroom to maximize this deduction." A selectable link to an article or other additional information about this deduction may also be provided to the user. The user may also select the Capture My Deduction button and take a photo of the receipt or bill. The smart phone may then take a picture of the receipt or bill with its built-in camera, The user may then select to save the deduction to the user profile 12, which may be stored on the memory element 22.

The rules in the deduction database 16 used in this example include:

Taxpayer must be a qualifying education professional at a K-12 school employed at least half time as a teacher, instructor, counselor, principal, or aide;
  Expense was not reimbursed; and
  Expense must be for supplies that are ordinary and necessary (subjective).

Because the last rule used to determine eligibility for the deduction was subjective, the rules in the deduction database 16 provided to the user may further include a list of the most common supplies or items deducted by teachers and may leave it up to the user's discretion as to whether or not their current purchase is "ordinary and necessary."

EXAMPLE 2

This use example describes a user who wants to use the computer program to automatically review their financial transactions for tax benefits. Via a personal financial management service or software, accessible via a website or employed or accessible by the computer program of the present invention, the user activates the computer program. The user previously set up their user profile 12 and indicated which accounts and what types of transactions they want automatically monitored for tax benefits. The user's tax return filed for the previous year may also be downloaded or accessed by the computer program and/or added to the user profile 12. The user is a classroom teacher, maintains a home office, and indicates that they wish to monitor their accounts for work-related deductions, home office-related deductions, charitable contributions, retirement savings, and medical deductions. The computer program uses information gathered from the user profile 12, prior tax returns, and identification tags applied or set by the user on similar transactions to analyze each transaction and/or rate each transaction for possible tax benefits.

Through the personal financial management service or website, the user may review transactions that have been flagged per rules set up in the computer program. On each transaction, the computer program may be used to produce suggested tax benefit categories and rate the probability and amount of a tax benefit. As the user reviews a list of tagged transactions, they can apply more accurate tags on individual transactions to indicate a tax benefit or remove tags to indicate it does not qualify to their situation. The computer program may be configured to remember or store these preferences and apply the tags set by the user on similar transactions where the context or category is evident, such as payments made to a qualifying charity. In some embodiments of the invention, tags may be suggested or provided based on common or popular tags used by a plurality of online users of the computer program. For example, if a threshold number of online users of the computer program tag a particular payee under the category "charity," then transactions to this payee may be automatically tagged "charity" in all users' accounts by default. However, default tags may be deselected by users manually as desired.

As the user reviews their tax benefits, they may attach additional documentation, such as an image of a receipt. The user's tagged transactions (with attachments) may be automatically saved to their account or user profile and may automatically update their online tax benefits summary.

In this example, the user already has an account on a website that aggregates financial data and the user has already set up the user profile 12. The user has indicated they wish to monitor their checking and IRA accounts for tax benefits using the computer program. The computer program has already determined the user's tax rate is 25% and that the user is a classroom teacher. The user has indicated in their user profile that they have a qualifying home office and specified an amount of space allocated for it in the home (100 sq. feet out of 1,000 total sq. feet). The user has indicated in their user profile they have employer-sponsored medical insurance, and the computer program has already tagged transactions that may have tax benefits.

Thus, in this example situation, the user logs in online to their personal financial management service or website and chooses to review their tax benefits using the computer program described herein. The computer program presents the user with a list of transactions that are candidates for tax benefits. Each transaction is rated for the probability of a Tax Benefit (Yes, No, Maybe), tagged with a suggested tax benefit category, and specifies the amount the benefit could reduce the user's tax bill.

The user may select an $80 payment made to Pennsylvania Power & Light, which has been tagged as "Home Office." The computer program may respond by opening a pop-up window on the display 28 containing the details of the payment made to Pennsylvania Power & Light and a tax benefit analysis. The computer program's analysis indicates the transaction is:

Type: Deduction
  Category: Utility Bill
  Work Related: Home Office
  Rated: Maybe
  Amount: $80
  Tax Benefit: $2 (10% of space in home).

The computer program may also provide a brief explanation of the tax benefit. The user is provided with the following options: attach documentation; save tax benefit (with optional description); reject the tax benefit; and/or print receipt cover sheet for files.

In this example, the user may also confirm the utility bill is applicable to their home office by saving the tax benefit. The system may then update the tax benefit rating on the transaction to yes (it is deductible) and save it to the user's account or profile.

The user may also select a payment to an office supply store for $120 that has been tagged as "Classroom Expenses." The computer program may respond by opening a pop-up window containing the details of the payment made to the office supply store and the tax benefit analysis. The following information may be provided:

Type: Deduction
  Category: Office Supplies
  Work Related: Classroom Expenses
  Rated: Maybe
  Amount $120
  Tax Benefit: $30.

The user may also be provided with a brief explanation of the tax benefit, noting that the user can spend up to $250 for classroom related expenses to maximize their tax benefits. The user may also be provided with the following options: attach documentation; save tax benefit (with optional description); reject the tax benefit; and/or print receipt cover sheet for files.

Next, the user may review the explanation of the tax benefit on the payment and select acceptance or rejection of the tax benefit. If rejected, for example, the transaction is excluded from the list of possible tax benefits that can be saved to the user's account or profile.

Next, the user may select a $100 payment to a charitable organization that is tagged as a charitable contribution. This selection prompts the computer program to open a pop-up window containing the details of the payment made to a charitable organization and the tax benefit analysis. The computer program has already determined that the particular charitable organization is a qualifying charity. In some embodiments of the invention, there may be sub-categories of charitable contributions that may change the predicted amount of the deduction. These sub-categories may be automatically determined (i.e., default tagging) and/or the user may be allowed to sub-select these in order to assess the tax liability estimate. The following information about the transaction is provided to the user:
  Type: Deduction
  Category: Charitable Contribution
  Work Related: No
  Rated: Yes It's Deductible
  Amount: $100
  Tax Benefit: $25.

A brief explanation of the tax benefit may then be provided to the user. The user is provided with the following options: attach documentation; save tax benefit (with optional description); reject the tax benefit; and/or print receipt cover sheet for files. The user confirms the payment was a qualifying charitable contribution and saves the tax benefit to the user account or profile.

The user also selects a $1,250 payment to St. Luke's Physicians Group, which has been set to a default tag via the computer program as a medical expense. This selection prompts the computer program to open a pop-up window containing the details of the payment made to St. Luke's Physicians Group and the tax benefit analysis. The computer program automatically determines that St. Luke's Physicians Group provides medical services based on keywords in the organization's name (i.e., "Physicians") and/or a stored list of medical service providers.

The computer program has also determined, via the user profile 12, that the user has employer provided health insurance, the payment was not made from a health savings account, and the user has not yet reached the threshold (7.5%) that would qualify the payment for a medical deduction. Thus, the following transaction information is provided to the user:
  Type: Deduction
  Category: Medical Expense
  Work Related: No
  Rated: Maybe
  Amount: $1,250
  Tax Benefit: $0 (* see explanation)

Following the tax benefit amount, note that the user is instructed to see an explanation. An explanation may be provided elsewhere on the screen and may explain that the user medical expenses would have to exceed 7.5% of their income for the deduction to qualify. The computer program may also recommend saving the transaction for evaluation later, since additional medical expenses may eventually total an amount exceeding the 7.5% threshold.

The user is provided with the following options: attach documentation; save tax benefit (with optional description); reject the tax benefit; and/or print receipt cover sheet for files. The user confirms the payment was a medical expense and saves the tax benefit for future evaluation to the user account or profile.

The user then selects a $1,000 payment to Fidelity Investments, which is identified in the user profile 12 as a traditional IRA Account. This selection prompts the computer program to open a pop up window containing the details of a transfer made to the IRA Account and the tax benefit analysis. The computer program has determined from the user profile 12 that the user is under the age of 50 and may contribute up to $5,000 to a traditional IRA. The following information about the transaction is provided:
  Type: Deduction
  Category: Retirement
  Work Related: No
  Rated: Yes
  Amount: $1,000
  Tax Benefit: $250 (* see explanation)

The user is provided with a brief explanation of tax benefits and disadvantages of a traditional IRA, as well as a suggestion that the user should contribute another $4,000 to this account to maximize their tax benefits. The system also suggests to the user that they consider opening a Roth IRA with a partner of the computer program provider (e.g., American Century) to limit future tax liability.

The user is provided with the following options: attach documentation; save tax benefit (with optional description); reject the tax benefit; and/or print receipt cover sheet for files. The user confirms the payment was to a qualifying traditional IRA account and saves the tax benefit to the user account or profile. The computer program then indicates that there are no further transactions to review at this time. The user may then review all recent transactions associated with particular tax benefits, save them, and review a summary of total tax savings so far this year.

In embodiments of the present invention and similar to determining how a purchase or other tax event affects the user's tax liability, the user's overall tax liability can be predicted at any intermediate time in the current tax year. As more information is inputted throughout the year into the computer program of the present invention, such as the user's purchases, investments, and tax payments, the probability of the prediction of the user's overall tax liability becomes more accurate. However, embodiments of the present invention are operable to predict the user's tax liability based on prior user information, including prior year tax information related to the user, which further includes prior year tax event information; demographic information for the user; known user information to date, including known tax event information to date within the current tax year; predicted user information for a remainder of the current tax year; and the tax requirements and rules for the current tax year. Similar to predicting the impact of a purchase on the user's current tax year liability, embodiments of the present invention that predict the user's overall tax liability account for a variety of information.

For example, embodiments of the present invention allow the user to access the computer program of the present invention at any intermediate time in the current tax year and determine the user's tax liability. If the user is informed that they will owe taxes, embodiments of the present invention are operable to suggest tax events to the user to lower the user's tax liability, such as investing in a qualified fund. As with predicting the tax liability associated with a particular tax event, embodiments of the present invention that predict the user's overall tax liability at an intermediate time in the year rely on the above-listed user information, including prior, known user information, and predicted user information. Similarly, a probability of the accuracy of the prediction can be provided.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A non-transitory computer readable storage medium with a computer program stored thereon for predicting an impact of a tax event on a user's tax liability, wherein the computer program instructs a processor to perform the following steps:
   acquire known user information related to the user and the user's taxes, wherein the known user information includes at least some information for at least one prior tax year and for a current tax year to date;
   predict at least some user information related to the user and the user's taxes for a remainder of the current tax year based at least partially on the known user information;
   acquire tax event information about the tax event,
   wherein the tax event is an action or an inaction that can be undertaken by the user, or by a third party that will have an effect on the user, and that will have an impact on the user's tax liability;
   compare the known user information, the predicted user information, and the tax event information with requirements for at least one of tax deductions and tax credits offered by a taxing authority;
   identify deductions or credits having requirements related to the known user information, the predicted user information, and the tax event information;
   predict the impact of the tax event on the user's tax liability based on the known user information, the predicted user information, the tax event information, and the requirements for at least one of tax deductions and tax credits for the current tax year;
   deteimine a probability of the predicted impact of the tax event, wherein the probability is based on the known user information, the predicted user information, the tax event information, and the requirements for at least one of tax deductions and tax credits for the current tax year; and
   use the determined probability to provide an indication of the user's eligibility for the tax deduction or credit.

2. The non-transitory computer readable storage medium of claim 1, wherein the tax event is a purchase of a good or service, and the tax event information is purchase information associated with the purchase.

3. The non-transitory computer readable storage medium of claim 2, wherein the purchase information further comprises at least one of an amount of the purchase and a category of the purchase.

4. The non-transitory computer readable storage medium of claim 3, wherein the computer program further instructs the processor to filter the user's financial records from the user's financial institution or financial management software to locate purchase information and to automatically sort various tax purchases into one or more pre-defined categories.

5. The non-transitory computer readable storage medium of claim 4, wherein the computer program further instructs the processor to automatically calculate the purchase information based on at least one of a UPC of the purchase, a digital receipt, and an image of a physical receipt.

6. The non-transitory computer readable storage medium of claim 2, wherein the computer program further instructs the processor to save at least one of credits and deductions associated with the purchase and output a summary including: a total of at least one of deductions and credits identified thus far during a current tax year and a total amount by which these deductions and credits are predicted to reduce the user's tax bill based on a predicted income and predicted tax bracket of the user.

7. The non-transitory computer readable storage medium of claim 1, wherein the tax event is an action taken by or affecting the user.

8. The non-transitory computer readable storage medium of claim 1, wherein the computer program further instructs the processor to calculate an estimated amount by which the credit or deduction will reduce the user's tax bill based on the known user information, the predicted user information, the tax event information, and the requirements for the deduction or credit.

9. The non-transitory computer readable storage medium of claim 1, wherein the predicted user information includes at least one of predicted income and predicted tax bracket.

10. The non-transitory computer readable storage medium of claim 1, wherein the known user information further comprises at least one of the user's occupation, the user's past tax returns, the user's city, county, state, or country of residence, the user's marital status, and information regarding the user's spouse.

11. A method for predicting an impact of a tax event on a user's tax liability, the method comprising the steps of:
   acquiring, via a computer, known user information related to the user and the user's taxes, wherein the known user information includes at least some information for at least one prior tax year and for a current tax year to date;
   predicting, via computer, at least some user information related to the user and the user's taxes for a remainder of the current tax year based at least partially on the known user information;
   acquiring, via a computer, tax event information about the tax event,
   wherein the tax event is an action or an inaction that can be undertaken or not undertaken by the user, or by a third party affecting the user, and that will have an impact on the user's tax liability;
   comparing, via a computer, the known user information, the predicted user information, and the tax event information with requirements for at least one of tax deductions and tax credits offered by a taxing authority;
   identifying deductions or credits having requirements related to the known user information, the predicted user information, and the tax event information;
   predicting, via a computer, the impact of the tax event on the user's tax liability based on the known user information, the predicted user information, the tax event information, and the requirements for at least one of tax deductions and tax credits for the current tax year;
   determine, via a computer, a probability of the predicted impact of the tax event, wherein the probability is based on the known user information, the predicted user information, the tax event information, and the requirements for at least one of tax deductions and tax credits for the current tax year; and use the determined probability to provide an indication of the user's eligibility for the tax deduction or credit.

12. The method of claim 11, wherein the tax event is at least one of:
   a purchase of a good or service, and the tax event information is purchase information associated with the purchase, and
   an action taken by or affecting the user.

13. The method of claim 12,
   wherein the purchase information further comprises at least one of an amount of the purchase and a category of the purchase,
   further comprising the step of filtering, via a computer, the user's financial records from the user's financial institution or financial management software to locate purchase information and to automatically sort various tax purchases into one or more pre-defined categories.

14. The method of claim 12, further comprising the step of saving, via a computer, at least one of credits and deductions associated with the purchase and outputting a summary including: a total of at least one of deductions and credits identified thus far during a current tax year and a total amount by which these deductions and credits are predicted to reduce the user's tax bill based on a predicted income and predicted tax bracket of the user.

15. The method of claim 11, further comprising the step of calculating, via a computer, an estimated amount by which the credit or deduction will reduce the user's tax bill based on the known user information, the predicted user information, the tax event information, and the requirements for the deduction or credit.

16. The method of claim 11,
   wherein the predicted user information includes at least one of predicted income and predicted tax bracket, and
   wherein the known user information further comprises at least one of the user's occupation, the user's past tax returns, the user's city, county, state, or country of residence, the user's marital status, and information regarding the user's spouse.

17. The non-transitory computer readable storage medium of claim 1, wherein said indication of the user's eligibility for the tax deduction or credit is provided as a percentage probability.

18. The non-transitory computer readable storage medium of claim 1, wherein said indication of the user's eligibility for the tax deduction or credit is provided as being above or below a threshold value.

19. The method of claim 11, wherein said indication of the user's eligibility for the tax deduction or credit is provided as a percentage probability.

20. The method of claim 11, wherein said indication of the user's eligibility for the tax deduction or credit is provided as being above or below a threshold value.

\* \* \* \* \*